T. C. BEACH.
TURN TABLE.
APPLICATION FILED SEPT. 22, 1913.
1,095,307.
Patented May 5, 1914.
2 SHEETS—SHEET 2.
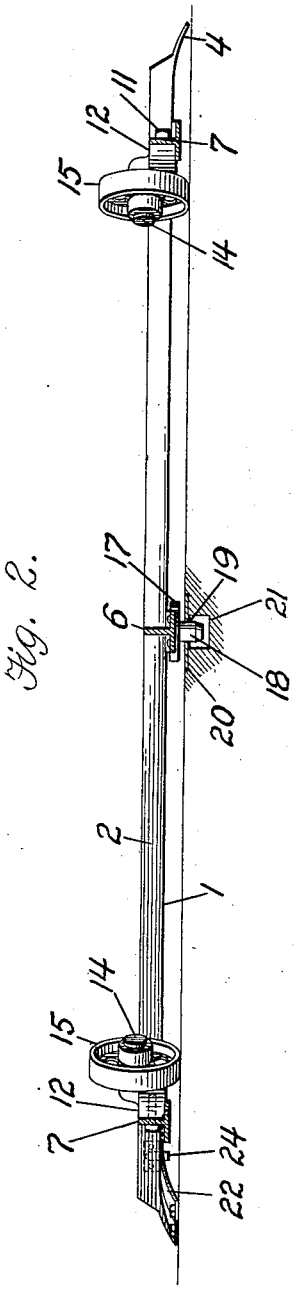
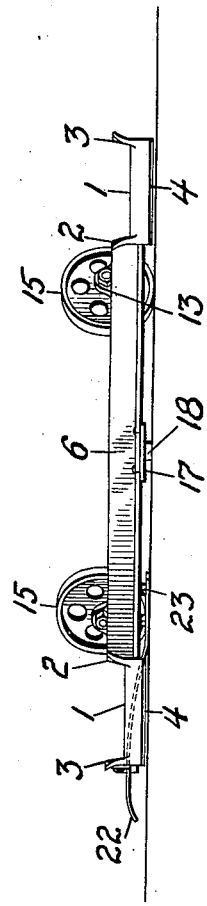
Witnesses
Chas. W. Stauffer
Karl H. Butler
Inventor
Thaddeus C. Beach,
By
Attorneys

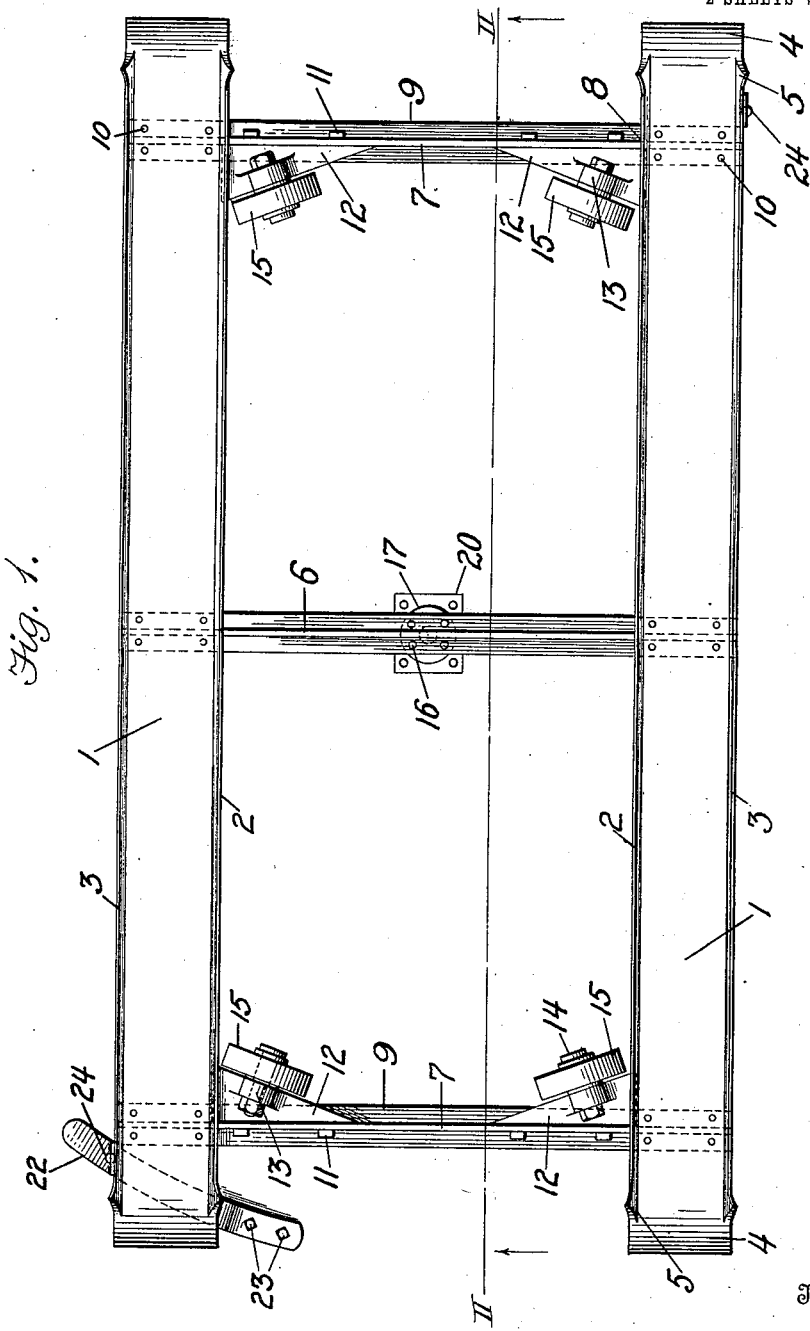

UNITED STATES PATENT OFFICE.

THADDEUS C. BEACH, OF ST. JOHNS, MICHIGAN.

TURN-TABLE.

1,095,307. Specification of Letters Patent. Patented May 5, 1914.

Application filed September 22, 1913. Serial No. 790,998.

*To all whom it may concern:*

Be it known that I, THADDEUS C. BEACH, a citizen of the United States of America, residing at St. Johns, in the county of Clinton and State of Michigan, have invented certain new and useful Improvements in Turn-Tables, of which the following is a specification, reference being had therein to the accompanying drawings.

This invention relates to turntables, and the objects of my invention are to provide a simple and durable structure that can be advantageously used for turning automobiles and other vehicles in garages, manufactories and other places, and to provide an inexpensive device consisting of comparatively few parts, easy to assemble and highly efficient for the purposes for which they are intended.

A further object of this invention is to eliminate wheels and other obstructions at the outer sides of a turntable that would interfere with or retard movements about a vehicle on the turntable.

I attain the above objects by a mechanical construction that will hereinafter be specifically described and then claimed.

Reference will now be had to the drawings, wherein there is shown a preferred embodiment of my invention, but it is to be understood that the structural elements are susceptible to such changes as fall within the scope of the appended claims.

In the drawings, Figure 1 is a plan of the turntable; Fig. 2 is a longitudinal sectional view of the same, and Fig. 3 is an end view of the turntable.

A turntable in accordance with this invention comprises runways in the form of channel bars 1 that are arranged in parallelism and have inner and outer longitudinal flanges 2 and 3 terminating at points removed from the ends of said bars, whereby the extremities of said bars can be bent downwardly, as at 4 to permit of the wheels of a vehicle easily riding on to the runways. The ends of the flanges 2 and 3 are flared or directed outwardly, as at 5 to eliminate any danger of a tire being injured by contacting with the ends of said flanges. The runways are supported and connected by spaced transverse T bars 6 and 7, said bars having the vertical flanges thereof cut, as at 8, whereby the lateral flanges 9 of said bars can be riveted or otherwise connected, as at 10 to the bottom sides of the runways, adjacent to the ends thereof.

Secured to the inner sides of the vertical flanges of the bars 7 by screw bolts 11 or other fastening means are triangular shaped corner blocks 12, which fit against the inner flanges 2 of said runways and rest upon the lateral flanges 9 of the bars 7. These blocks add rigidity to the framework of the turntable and are provided with bearings 13 at the angular edges of said blocks, whereby spindles 14 can be mounted in said bearing for revolubly supporting wheels or rollers 15 at the inner sides of said blocks. The wheels can be of the roller bearing type with wide treads to insure an easy movement of the turntable.

Secured to the lateral flanges of the bar 6, intermediate the ends thereof, by rivets 16 or other fastening means, is a recessed center plate 17. This plate has a depending pivot pin 18 which has the lower end thereof tapered or beveled to easily enter an opening 19 in a floor or ground plate 20. The plate 20 is mounted above a recess 21 in a floor or ground, said recess providing clearance for the pivot pin 18.

To hold the turntable against rotating while a vehicle is mounting the same, I use a hold-fast device, comprising a resilient compressible member or flat spring 22 that is arranged in the path of the ends of the runways and has one end secured as at 23 to the floor or ground. The opposite end has an opening to receive a depending pin or detent 24, carried by the outer flanges 3 of the runways. The ends of the runways can readily ride over the hold-fast devices, and when the turntable is not in use it can be raised, placed on its edge and carried to a suitable place for storage.

Some of the advantages gained by my improved turntable are:—That it allows a car to be turned within its length; reduces space ordinarily required to maneuver cars; permits a car being safely placed upon the turntable without danger of table shifting or tires being injured, and allows a car to face a door so that the risk and inconvenience arising from backing out of a garage is obviated. Another advantage is that the device is entirely self contained the supporting bearings or wheels being on inside of runways thereby making it convenient as a wash or repair table, there being no projecting parts.

What I claim is:—

1. A turntable comprising parallel channel runways, spaced T bars connecting said runways and having the vertical flanges thereof cut away to provide clearance for said runways, a center plate carried by one of said T bars and having a depending pivot pin, corner blocks connecting the other of said T bars and said runways, and wheels revolubly supported thereby.

2. A turntable comprising parallel channel runways, spaced T bars connecting said runways and having the vertical flanges thereof cut away to provide clearance for said runways, a center plate carried by one of said T bars and having a depending pivot pin, corner blocks connecting the other of said T bars and said runways, wheels revolubly supported thereby, a depending pin at an end of each runway, and a holdfast device adapted to be engaged by one of said pins to lock said turntable whereby a vehicle can mount the same.

3. A turntable comprising channel runways, spaced T bars connecting said runways, a center plate carried by one of the said T bars and provided with a depending pivot pin, corner blocks connected to the other of said T bars at said runways, bearings carried by said blocks at the angularly disposed edges thereof, and wheels having spindles journaled in said bearings.

4. A turntable comprising channel runways, spaced T bars connecting said runways, a center plate carried by one of the said T bars and provided with a depending pivot pin, corner blocks connected to the other of said T bars at said runways, bearings carried by said blocks at the angularly disposed edges thereof, wheels having spindles journaled in said bearings, a depending pin at an end of each runway, and a resilient holdfast device adapted to be engaged by a pin to hold said turntable whereby a vehicle can safely mount the same.

5. A turntable comprising parallel channel runways having the longitudinal flanges thereof terminating at a point removed from the ends of said runways whereby the ends of said runways can be bent downwardly, spaced T bars connecting said runways and having the vertical flanges thereof cut away to provide clearance for said runways, a center plate carried by one of said bars, and provided with a depending pivot pin, blocks connected to the other of said bars at said runways, and wheels revolubly supported by said blocks and disposed at an angle relatively to said runways.

6. A turntable comprising parallel channel runways having the longitudinal flanges thereof terminating at a point removed from the ends of said runways whereby the ends of said runways can be bent downwardly, spaced T bars connecting said runways and having the vertical flanges thereof cut away to provide clearance for said runways, a center plate carried by one of said bars and provided with a depending pivot pin, blocks connected to the other of said bars at said runways, wheels revolubly supported by said blocks and disposed at an angle relatively to said runways, a depending pin at an end of each runway, and a resilient holdfast device adapted to be engaged by a pin to lock said turntable against movement in a horizontal plane.

7. In a turntable, an apertured ground plate, runways, T bars connecting said runways, a center plate carried by one of said bars and having a depending pivot pin detachably mounted in said ground plate, triangular shaped blocks connected to the other of said T bars against said runways, wheels revolubly supported by said blocks and disposed at an angle to said runways, and means in the path of said turntable and adapted to be engaged by an end thereof for holding said turntable against accidental displacement when a vehicle mounts the same.

In testimony whereof I affix my signature in presence of two witnesses.

THADDEUS C. BEACH.

Witnesses:
OTTO F. BARTHEL,
ANNA M. DORR.

Copies of this patent may be obtained for five cents each, by addressing the "Commissioner of Patents, Washington, D. C."